Nov. 26, 1935.     G. A. LYON     2,022,119
MOLDING
Filed Dec. 20, 1930     2 Sheets-Sheet 2
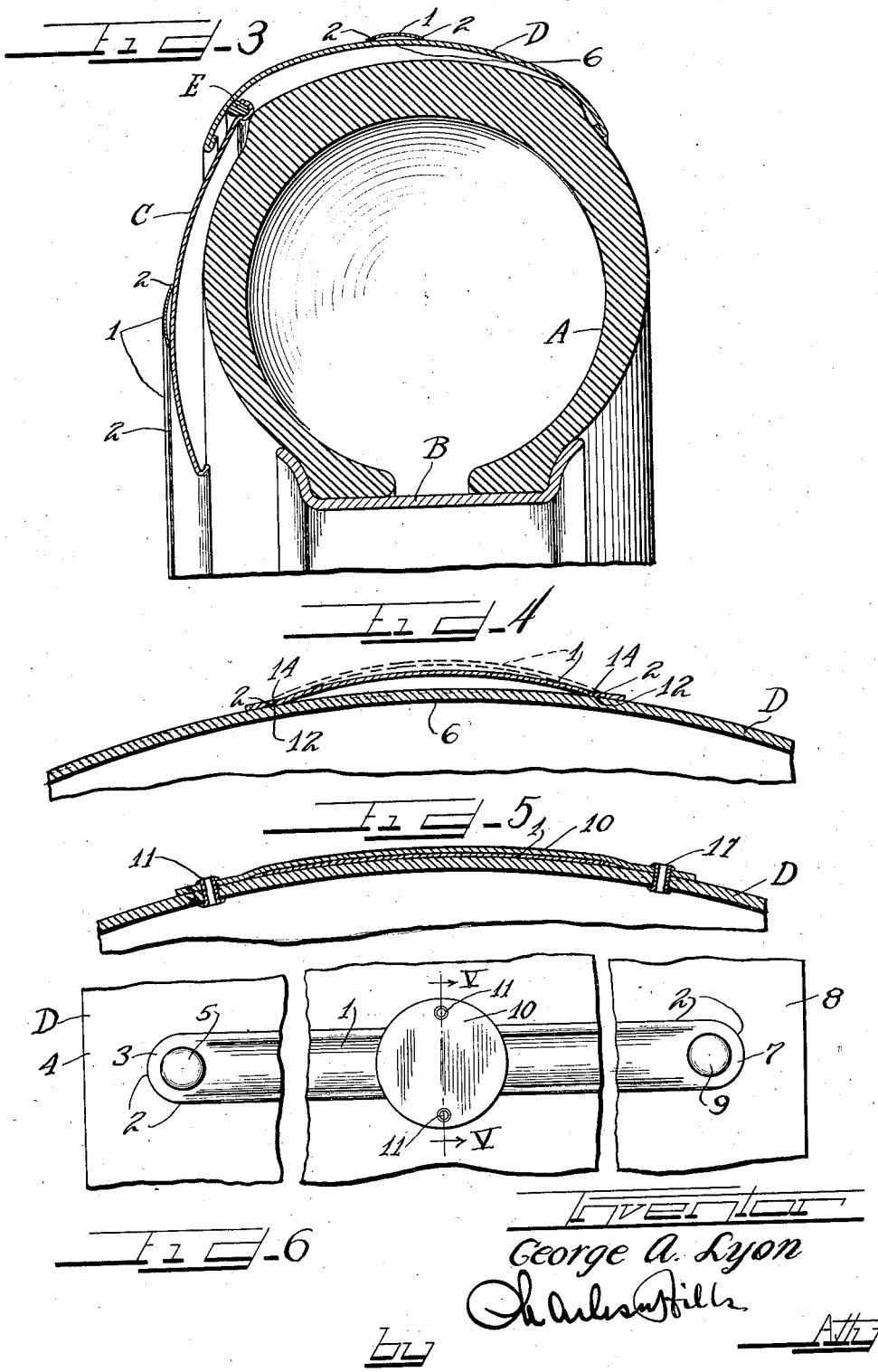

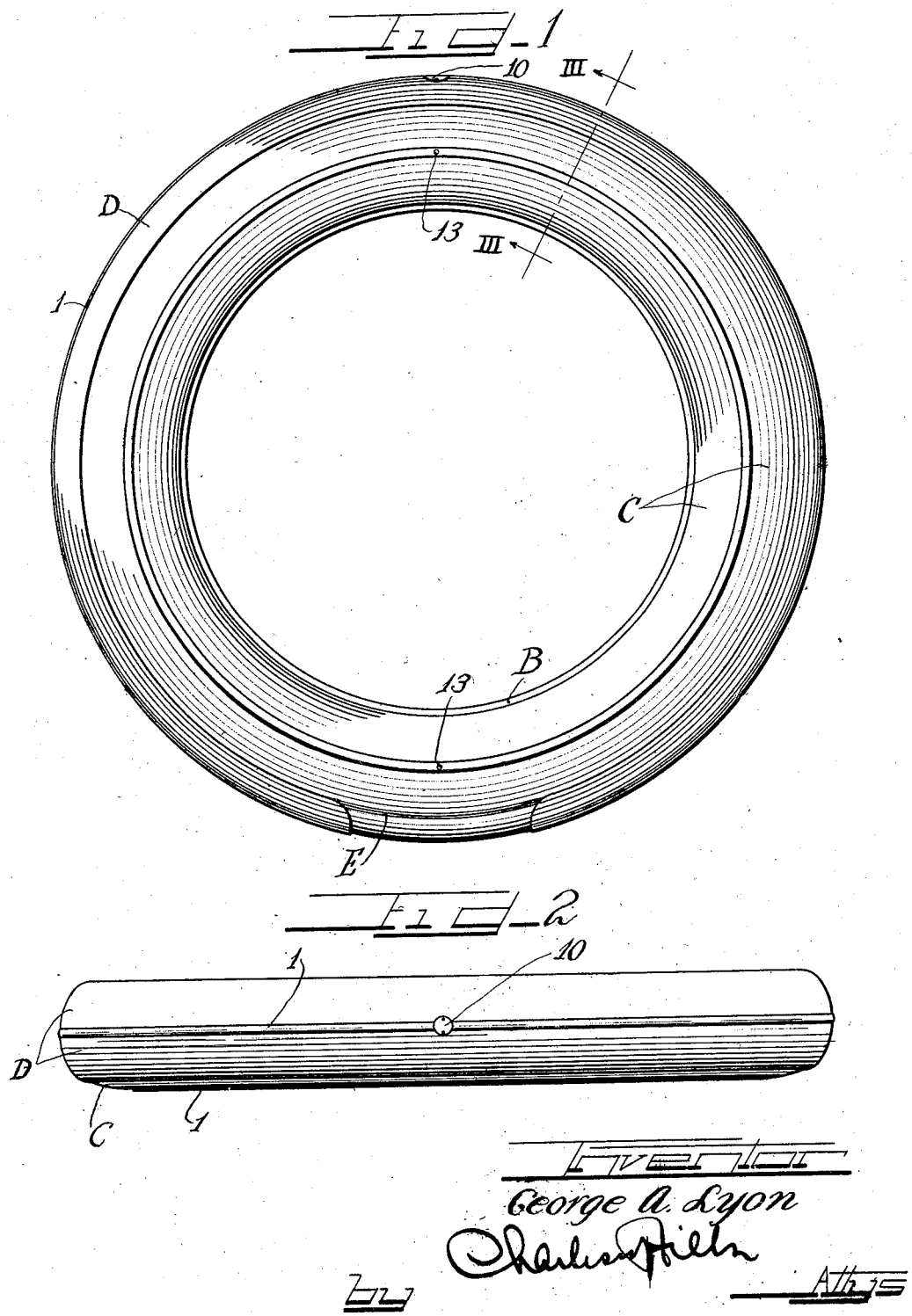

Patented Nov. 26, 1935

2,022,119

UNITED STATES PATENT OFFICE 2,022,119

MOLDING

George A. Lyon, Allenhurst, N. J., assignor to Lyon Incorporated, Asbury Park, N. J., a corporation of Delaware Application December 20, 1930, Serial No. 503,743

2 Claims. (Cl. 150—54)

This invention pertains to molding, particularly of the character constructed of metal or similar stiff material and to be used in connection with supports such as tire covers.

Molding heretofore in vogue has been employed universally with supporting means of an inflexible character. I have in mind, for example the type of molding in use in connection with automobile bodies, as disclosed in the patent to Vetter, No. 1,491,120, issued April 22, 1924. While such molding construction accomplishes the purpose for which it is designed, it would be undesirable in connection with the outer periphery of a tire cover, for example, to be mounted in the fender well of an automobile. The drawbacks are two-fold; first, the molding would interfere with a proper fit of the tire cover within the adjacent smooth wall of the well, with the accompaniment of rattling; second, if secured to a tire cover member which is flexible and is adapted to be expanded and contracted, the molding would buckle, and after a certain period of use would present an undesirable appearance.

It is accordingly one of the principal objects of the invention to provide trim molding which is efficient in use in connection with any support, whether rigid or flexible.

Another essential object of this invention is to provide molding securable to the periphery of a support without interfering with the fit of such support in a socket adapted to receive the same, as in the case of a tire cover in a fender well.

A still further object consists in providing molding comprising a strip or ribbon of concavo-convex resilient material such as metal.

Another object involves the provision of a resilient buffer for a tire cover mounted in a fender well.

It is an object of the present invention to provide means for protecting coated surfaces of a tire cover and the like from such abrasion as might result in a scratching or bruising of the surface thereof.

It is a further object of the invention to provide in connection with tire covers or the like, molding for improving the appearance thereof.

Another object of the invention resides in the provision of novel molding to be used in connection with tire covers, the edges of which molding are narrow to blend with the adjacent surface of the tire cover member in connection with which it is used so that the surface of such member will be substantially uninterrupted.

A still further object of the invention is to provide molding in connection with a tire cover, or other support, which molding will tightly grip and maintain itself against accidental displacement relative thereto.

It is another object of the invention to employ a special process of securing a strip of molding to a surface or support of the same less or greater curvature than the normal curvature of the molding.

In carrying out the invention, for example, in connection with the outer annular split ring of one form of tire cover, I provide a strip of preferably very thin spring steel molding, preferably rustless or having a rust resisting surface, concavo-convex in cross-section, and fasten the same to such annular member in such a manner that the strip is compressed. This causes the edges of the strip to tightly grip the surface of the tire cover member, thereby resisting lateral displacement relative thereto. As a further preventive against lateral displacement, a member traversing said strip may have its ends secured to the tire cover, and such member may, if desired, be in the form of a name plate or the like bearing the name of the manufacturer or of the owner of the cover or the like. The ends of the strip are suitably secured by riveting or spot-welding or otherwise to the end portions of the tire cover. The edges of the strip blend harmoniously with the surface to which it is secured, and the whole presents a very pleasant appearance, especially when the tire cover is coated in some color of enamel and the strip of molding is chrome plated or similarly finished. The portion of the cover receiving the strip may be crowned and the strip is located preferably in the center of the crown or such portion may be flat or otherwise shaped. Inasmuch as the center of the crown portion of the cover is normally more likely to engage with the ground or elsewhere than any other part of the cover, the desirability of locating the molding at the center of the crown will become evident. The molding will thus serve to space the other parts of the cover from the ground or the like, thereby preventing injury to the surface thereof.

In applying the strip to the cover, said strip may be normally straight and then have imparted to it a curvature corresponding with the curvature of the tire cover or the like while it is being applied. In such event, certain precautions must be taken in order to prevent buckling of the edges of the strip, due to the transverse concavity of the latter. To prevent such buckling, the strip is preferably secured to one portion of the tire cover, and then sufficient tension is applied thereto as it is curved about the tire cover to prevent buckling of said longitudinal edges of the strip, and while the strip is so tensioned, the same is secured at its opposite end to the tire cover.

If desired, however, the strip may be preformed longitudinally to any desired curvature and then applied by spot welding or otherwise.

Other and further important objects and advantages of this invention will be apparent from the disclosure in the specification and the accompanying drawings.

The invention (in a preferred form) is illustrated in the drawings and hereinafter more fully described.

On the drawings:

Figure 1 illustrates a tire cover applied on a spare tire and embodying molding in accordance with the present invention.

Figure 2 is a top plan view of the same.

Figure 3 is an enlarged fragmentary sectional view taken approximately in the plane indicated by the line III—III in Figure 1.

Figure 4 is an exaggerated fragmentary view in cross-section showing the relationship between the molding and the tire cover member in connection with which it is used, after the molding has been secured in position, the dotted lines showing the normal condition of the molding.

Figure 5 is a view similar to Figure 4 but showing a name plate serving to prevent shifting of the molding relative to the surface to which it is connected, this view being taken substantially in the plane indicated by the line V—V in Figure 6.

Figure 6 is a development of one type of tire cover with the molding applied thereto, showing the manner in which the molding is secured to such member, said development being partly broken away for convenience of illustration.

As shown on the drawings:

Referring now more particularly to the drawings, wherein the same parts are indicated in each case by the same reference characters, the spare tire A, mounted on the rim B has its tread and one side wall encased in a tire cover comprising an annular side plate C and an outer preferably resilient ring D, the parts C and D being cushioned apart by means of a rubber or the like resilient strip E secured to the side plate C.

The molding made in accordance with the present invention comprises a concavo-convex strip 1 of thin preferably resilient sheet material such as metal so that the upper convex surface of the strip will form a substantial continuation of the surface to which the strip is to be secured. The strip 1 may be preformed in length to correspond to the length throughout which it is to extend when applied to a support, such as a tire cover. If desired, the strip 1 may be normally longitudinally straight before application to the surface of a support, or preformed longitudinally to the same or a different curvature and then fastened to the support. In either of such events, in accordance with one form of the invention, referring now more particularly to the outer ring D of the tire cover, one end 3 of the strip 1 is secured adjacent one end 4 of the outer ring D by means of a rivet 5, spot-welding or the like, and while the ring member D is held stationary, a heavy weight or other tensioning means is applied to the free portion of the strip as the latter engages the crown portion 6 of the member D, the tension being sufficiently great to prevent buckling of the edges 2 of the strip 1. It is a simple matter to determine the degree of tension necessary merely by observing the strip throughout its length upon engagement with the cover member D. The opposite end 7 of the strip 1 is then secured to the corresponding end 8 of the cover member D by means of a rivet 9, spot-welding or the like, the curvature of the ends 3 and 7 conforming preferably to that of the rivets or the like 5 and 9.

Due to the fact that the strip is secured to the support while the strip is under tension, the strip is of somewhat less transverse curvature after application than prior to such application, as shown in full and dotted lines, respectively, in Figure 4. Accordingly, it will be appreciated that the edges 2, when the strip is applied, will grip the surface of the support with a substantial pressure because of the tendency of the strip to assume its normal tranverse curvature. If the support is prefectly flat where it is covered by the strip, the pressure aforesaid between the longitudinal edges 2 of the strip and the adjacent surface of the support will be sufficient to offer substantial resistance to, and retain the strip from, lateral displacement. If, on the other hand, the supporting surface to be covered by the strip be curved as illustrated herein, it will be apparent that the transverse curvature of the support will serve, in addition to the pressure of the edges 2 on such support, to resist relative lateral displacement between the support and the strip.

Should it be desired to additionally and positively prevent shifting of the strip 1 relative to the support D, this can easily be done by providing means straddling the strip. While such means may take any form, one desirable form may involve the provision of a member 10 located preferably centrally intermediate the rivets 5 and 9 and secured to the support D by means of eyelets 11 or the like on opposite sides of the strip 1. The member 10 may be in the form of a name plate to carry the name of the manufacturer of the owner of the supporting device. It will be appreciated, of course, that the member 10 may conform to the curvature of the support D, in which event the cooperating portion of the strip 1 will be substantially entirely in engagement with the support D as shown in Figure 5, or the member 10 may be otherwise formed.

It will be understood from the foregoing that by reason of the resilience of the strip 1 and the fact that, when applied on the support, all parts except the edges of such strip are spaced from the support, the strip constitutes in effect a shock absorbing instrumentality for said support and will yield, with resultant relative movement between the edges 2 and the corresponding surface of the support, when the supporting member is rested on the ground or elsewhere, such as in a fender well, over the strip 1, or the latter receives a thrust in any direction, which may occur in handling or in shipping. It will be noted that the engagement between the edges 2 and the surface of the support occurs along an area at 12, rather than along a sharp line, for example, due to the tension to which the strip is subjected, so that relative movement between the edges 2 and the surface of the support will not result in scratching of the surface, be it painted or otherwise coated.

In employing a length of the strip 1 in connection with a relatively inflexible support, compared with the resilient split ring D, for example, it will be seen that the task of securing the strip may be accomplished without necessitating the application of any appreciable tensioning stress on the strip during application of the same. In applying the strip to a relatively rigid member, such as the side plate C, of a tire cover or the like, the strip is preferably preformed substantially or exactly to the desired shape, and where the ends of the strip are preferably welded together or otherwise permanently connected, and then riveted or otherwise suitably secured in place, as indicated at 13 in Figure 1.

When used in connection with a support of the character illustrated at D herein, a drawing together of the ends of the ring D obviously will stretch the strip and hence will not buckle the same, and a separation of such ends will also not buckle the strip for the reason that such a possibility is obviated by subjecting the strip, when securing the same, to a sufficiently great tension.

The strip material 1 is preferably made of very light gage material, that is, about .005 inch to .006 inch in thickness, and may be used in any width. When used with supporting members such as the flexible ring D, strip molding ranging in width substantially from ⅝ inch to 1¼ inch has been found suitable to apply without necessitating preforming of the strip to the curvature of the support. Where the width of strip is so great or the support has a crown of such curvature that the strip, if not preformed substantially to the longitudinal curvature of the support, or at least to some degree of curvature, will buckle even under great tension when applied to the support, then it is advisable to preform such a strip to a curvature sufficient to obviate buckling. This is found to be particularly true in the case of a support having a crown of a curvature approximating the transverse curvature of the strip. In such event, if adequate precaution is not taken, the edges of the strip will not contact the support under certain conditions of distortion of the support and there would exist a likelihood of buckling which, although momentary, might bend the strip metal.

It will thus be appreciated that a tire cover embodying molding made in accordance with the invention disclosed not only makes a special appeal to the esthetic sense but also is susceptible of attachment in the fender well of a car as well as at the rear. When in a fender well, the molding will not interfere appreciably with the fit of the tire cover therein since the molding may be compressed substantially flat against the parts of the tire cover to which it is connected, yet will, nevertheless serve to space the cover members C and D from the well and thereby protect the surfaces of such members.

In view of the fact that the strip 1 is of very light gage metal, the edge portions 2 will practically be continuous with the adjacent portions of the surface of the supporting member. This will not only enhance the appearance of the supporting member, but will serve to offer substantially no resistance such as a blunt edge or obstruction would offer to the movement of the hand or finger or other member transversely over the surface of the supporting member. Moreover, such construction will give the appearance, to the observer, of molding which is inlaid as though the supporting member were provided with a depression in which the molding fitted. This adds materially to the appearance of the member in connection with which the molding is used. Moreover, the strip being securable directly to the surface of a support the need for a groove or rib means or snap-over clips is obviated.

While, as stated, the strip may be positively fastened to a support, thereby obviating the need for a groove or rib or the like on the support, it is nevertheless well within the province of the present invention to provide either a groove or rib means for this purpose. In the case of an endless groove to receive an endless strip of molding, the use of other fastening means may be obviated by constructing the concavo-convex strip so that its normal minimum periphery is slightly less than the periphery of the support adjacent the groove. Under such circumstances, the strip may be stretched as it is applied, and then allowed to snap into the groove, the strip preferably exerting pressure on the base of the groove to prevent rattling. When used in connection with a groove, the strip may have either its convex or its concave surface facing the base of the groove. When snapped over rib means on the support, the endless concavo-convex strip, it will be understood, will have its concave surface facing the rib means, with contact occurring either between said surface and the rib means, or between the edges of the strip and the support proper, or between both sets of portions. In any event the molding will be effectively held in place.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a spare tire cover including a transversely curved tread covering portion, a transversely curved beading strip extending longitudinally of and secured to said portion, said strip having its longitudinal margins in tensioned engagement with the curved surface of said cover portion and having its longitudinal intermediate portion arched away from the surface of said cover portion.

2. In a spare tire cover including a transversely curved tread covering portion, a transversely curved beading strip extending longitudinally of and secured to said portion, said strip having its longitudinal margins in tensioned engagement with the curved surface of said cover portion and having its longitudinal intermediate portion arched away from the surface of said cover portion, said marginal edges of the strip being of a lesser radius than that of the external surface of said cover portion engaged thereby and so as to resist lateral movement of said beading strip, said beading strip being secured to said covering portion at points spaced apart at least 180°.

GEORGE A. LYON.